(12) United States Patent
Yen et al.

(10) Patent No.: US 7,312,936 B2
(45) Date of Patent: Dec. 25, 2007

(54) DIGITAL IMAGE-CAPTURING DEVICE

(75) Inventors: Jung-Chun Yen, Taichung (TW); Chun-Hsiung Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 36 days.

(21) Appl. No.: 11/271,734

(22) Filed: Nov. 14, 2005

(65) Prior Publication Data
US 2006/0171047 A1 Aug. 3, 2006

(30) Foreign Application Priority Data
Jan. 31, 2005 (TW) .............................. 94102880 A

(51) Int. Cl.
G02B 7/02 (2006.01)
G03B 21/14 (2006.01)
G03B 17/00 (2006.01)
(52) U.S. Cl. ...................... 359/811; 359/699; 359/829; 353/100; 396/529
(58) Field of Classification Search ................ 359/826, 359/829–830
See application file for complete search history.

(56) References Cited
U.S. PATENT DOCUMENTS

| | | | |
|---|---|---|---|
| 4,269,479 A * | 5/1981 | Hamatani | 359/826 |
| 5,130,851 A * | 7/1992 | Shirie | 359/700 |
| 5,572,374 A * | 11/1996 | Okada et al. | 359/827 |
| 5,587,843 A * | 12/1996 | Chen | 359/700 |
| 6,278,843 B1 * | 8/2001 | Iwasaki et al. | 396/72 |
| 6,597,524 B2 * | 7/2003 | Sasaki | 359/811 |
| 6,639,730 B2 * | 10/2003 | Muto et al. | 359/694 |
| 6,989,944 B2 * | 1/2006 | Yasutomi et al. | 359/699 |
| 7,016,121 B2 * | 3/2006 | Kawanabe et al. | 359/694 |
| 2005/0105193 A1 * | 5/2005 | Kawanabe et al. | 359/694 |

* cited by examiner

Primary Examiner—Scott J. Sugarman
Assistant Examiner—DaWayne A Pinkney
(74) Attorney, Agent, or Firm—Birch, Stewart, Kolasch & Birch, LLP

(57) ABSTRACT

A digital image-capturing device includes an outer lens barrel, an image sensor disposed in the outer lens barrel, an inner lens barrel mounted in the outer lens barrel, and a lens module mounted in the inner lens barrel. The outer lens barrel has a barrel coupling segment formed with an internal screw thread, and a barrel guiding segment. The inner lens barrel has a barrel engaging segment formed with an external screw thread to engage threadedly the internal screw thread of the barrel coupling segment, and a barrel sliding segment in sliding and rotatable contact with the barrel guiding segment. When the inner lens barrel is inserted into the outer lens barrel, the barrel guiding segment can guide the barrel sliding segment to prevent the inner lens barrel from wobbling and to maintain optical axis alignment, thereby ensuring image-capturing quality of the device.

7 Claims, 5 Drawing Sheets

DIGITAL IMAGE-CAPTURING DEVICE

CROSS REFERENCE TO RELATED APPLICATION

This application claims priority of Taiwanese application No. 094102880, filed on Jan. 31, 2005.

BACKGROUND OF THE INVENTION

1. Field of the Invention

The invention relates to a digital image-capturing device, more particularly to a digital image-capturing device capable of maintaining optical axis alignment among components thereof.

2. Description of the Related Art

FIG. 1 illustrates a conventional digital optical instrument 10, such as a telescope, for viewing distant objects and for capturing images of the distant objects. The conventional digital optical instrument 10 includes a first conventional digital image-capturing device 12 mounted inside a casing 11 of the optical instrument 10.

The first conventional digital image-capturing device 12 includes an image sensor 13 (for instance, a CCD or a CMOS sensor) connected to a circuit board 14 and mounted collectively in the casing 11, an outer lens barrel 15 mounted in the casing 11 and spaced apart from the image sensor 13, an inner lens barrel 16 mounted threadedly in the outer lens barrel 15, and a lens module 17 mounted in the inner lens barrel 16. The device 12 has an optical axis (O).

The outer lens barrel 15 has a first central axis 151, and a first hole-confining surface 153 that surrounds the first central axis 151, that confines a first hole 152, and that is formed with an internal screw thread 154.

The inner lens barrel 16 has a second central axis 161, a second hole-confining surface 163 that surrounds the second central axis 161 and that confines a second hole 162, and an outer barrel surface 164 that is formed with an external screw thread 165 to engage threadedly the internal screw thread 154.

The lens module 17 includes a set of focusing lenses 173, 174, 175 and a light-filtering lens 176, all mounted in the second hole 162.

When an optical axis 177 of the lenses 173, 174, 175, 176 and an optical axis 131 of the image sensor 13 are aligned with the optical axis (O), the image quality of the images captured by the first conventional digital image-capturing device 12 is optimized, which is the goal manufacturers try to achieve.

Although the first conventional digital image-capturing device 12 has the ability to capture distant images, it has the following limitations:

1. Since the image sensor 13 and the outer lens barrel 15 are mounted separately in the casing 11, it is easy for the optical axis 131 of the image sensor 13 and the optical axis 177 of the lenses 173, 174, 175, 176 to deviate from the optical axis (O), thereby resulting in degradation of the quality of the images captured by the first conventional digital image-capturing device 12.

2. Since the image sensor 13 and the outer lens barrel 15 are mounted separately in the casing 11, and since there is no means for shielding between the image sensor 13 and the lens module 17, light leakage in the optical path between the image sensor 13 and the lens module 17 is likely to occur, which in turn degrades the quality of the images captured by the first conventional digital image-capturing device 12.

3. The inner lens barrel 16 is turned threadedly to move the inner lens barrel 16, as well as the lens module 17, closer to or away from the image sensor 13 along the second central axis 161 in order to perform focusing adjustments. However, due to gaps present between the internal screw thread 154 and the external screw thread 165, when the lens module 17 moves along with the inner lens barrel 16, the possibility for the optical axis 177 of the lenses 173, 174, 175, 176 to deviate from the optical axis (O) is high, thus resulting in image-quality degradation in the first conventional digital image-capturing device 12.

As shown in FIG. 2, a second conventional digital image-capturing device 20 includes an outer lens barrel 21, an image sensor 22 connected to a circuit board 23 that is mounted to the outer lens barrel 21, an inner lens barrel 24 mounted threadedly in the outer lens barrel 21 and spaced apart from the image sensor 22, and a lens module 25 mounted in the inner lens barrel 24. The device 20 has an optical axis (O).

The second conventional digital image-capturing device 20 is built by mounting the various components thereof in the outer lens barrel 21. The outer lens barrel 21 is then mounted in the casing 11 of the optical instrument 10.

The second conventional digital image-capturing device 20 is capable of overcoming the aforementioned first and second limitations of the first conventional digital image-capturing device 12. However, since the outer lens barrel 21 and the inner lens barrel 24 are interconnected threadedly through an internal screw thread 211 and an external screw thread 241, implying that there are gaps present between the internal screw thread 211 and the external screw thread 241, during focusing adjustments, the optical axis 251 of the lens module 25 is likely to deviate from the optical axis (O), thus resulting in image-quality degradation in the second conventional digital image-capturing device 20.

SUMMARY OF THE INVENTION

Therefore, the object of the present invention is to provide a digital image-capturing device that is capable of maintaining optical axis alignment among components thereof to ensure the image-capturing quality of the digital image-capturing device.

According to the present invention, the digital image-capturing device comprises an outer lens barrel, an image sensor, an inner lens barrel, and a lens module. The outer lens barrel has first and second barrel portions, and a barrel hole that extends through the first and second barrel portions. The second barrel portion has a hole-confining surface that is formed with a barrel coupling segment and a barrel guiding segment. The barrel coupling segment is formed with an internal screw thread. The image sensor is disposed in the first barrel portion of the outer lens barrel. The inner lens barrel is mounted in the second barrel portion of the outer lens barrel, and has an outer barrel surface that is formed with a barrel engaging segment and a barrel sliding segment. The barrel engaging segment is formed with an external screw thread to engage threadedly the internal screw thread of the outer lens barrel. The barrel sliding segment is in sliding and rotatable contact with the barrel guiding segment of the outer lens barrel. The lens module is mounted in the inner lens barrel.

BRIEF DESCRIPTION OF THE DRAWINGS

Other features and advantages of the present invention will become apparent in the following detailed description of the preferred embodiments with reference to the accompanying drawings of which.

DETAILED DESCRIPTION OF THE PREFERRED EMBODIMENT

Before the present invention is described in greater detail, it should be noted herein that like elements are denoted by the same reference numbers throughout the disclosure.

Figure 1:
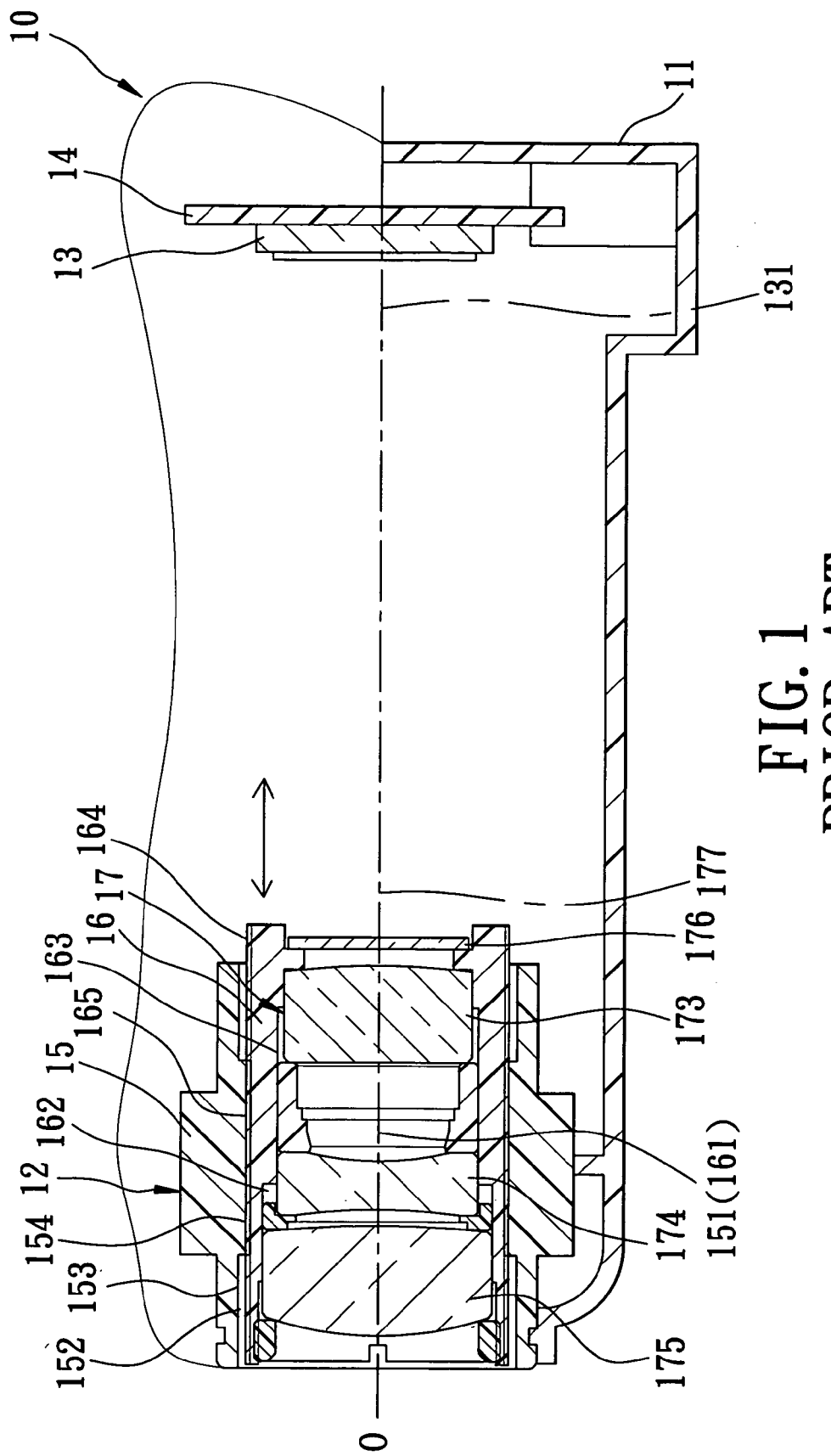
FIG. 1 is an assembled sectional view of a digital optical instrument provided with a first conventional digital image-capturing device.
Figure 2:
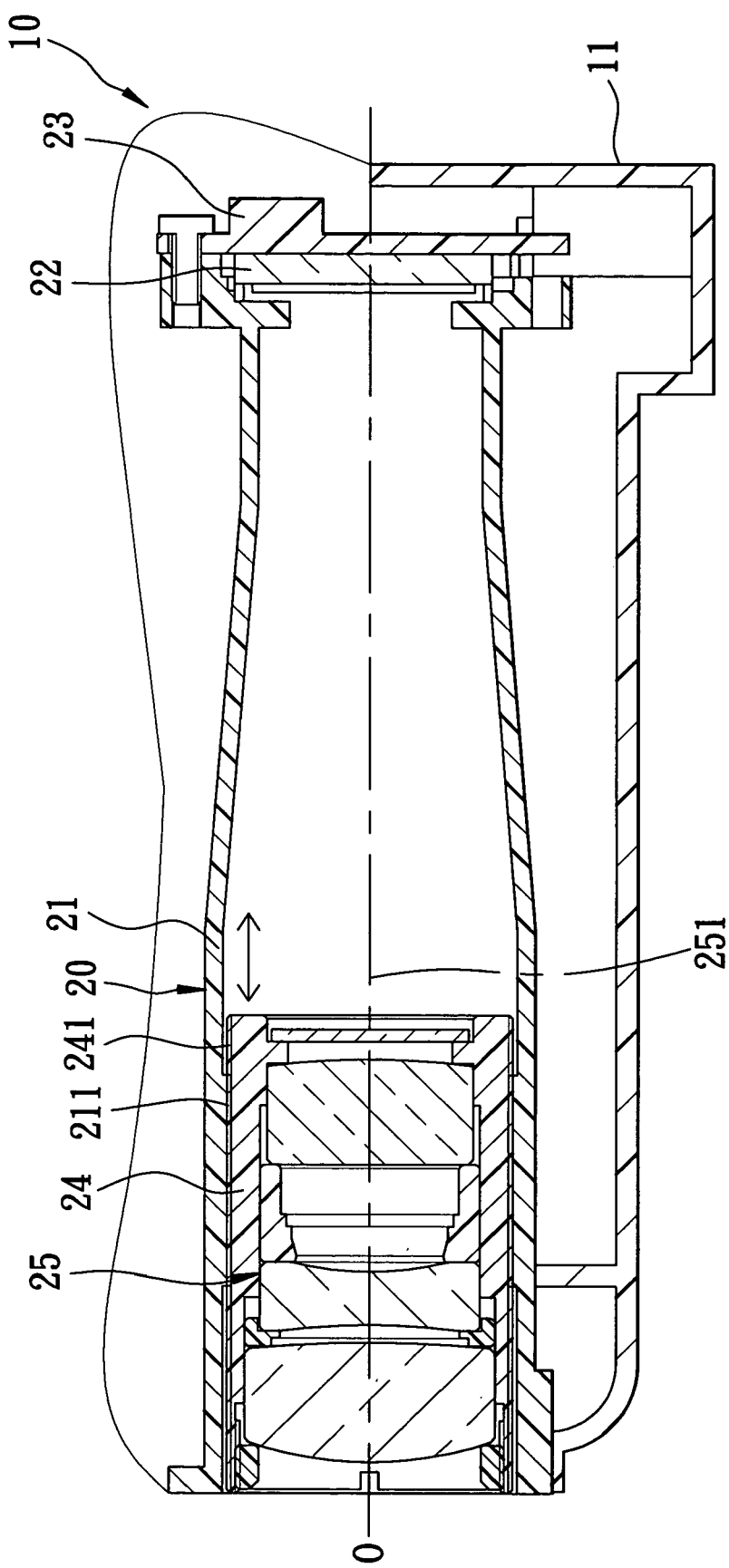
FIG. 2 is an assembled sectional view of a digital optical instrument provided with a second conventional digital image-capturing device.
Figure 3:
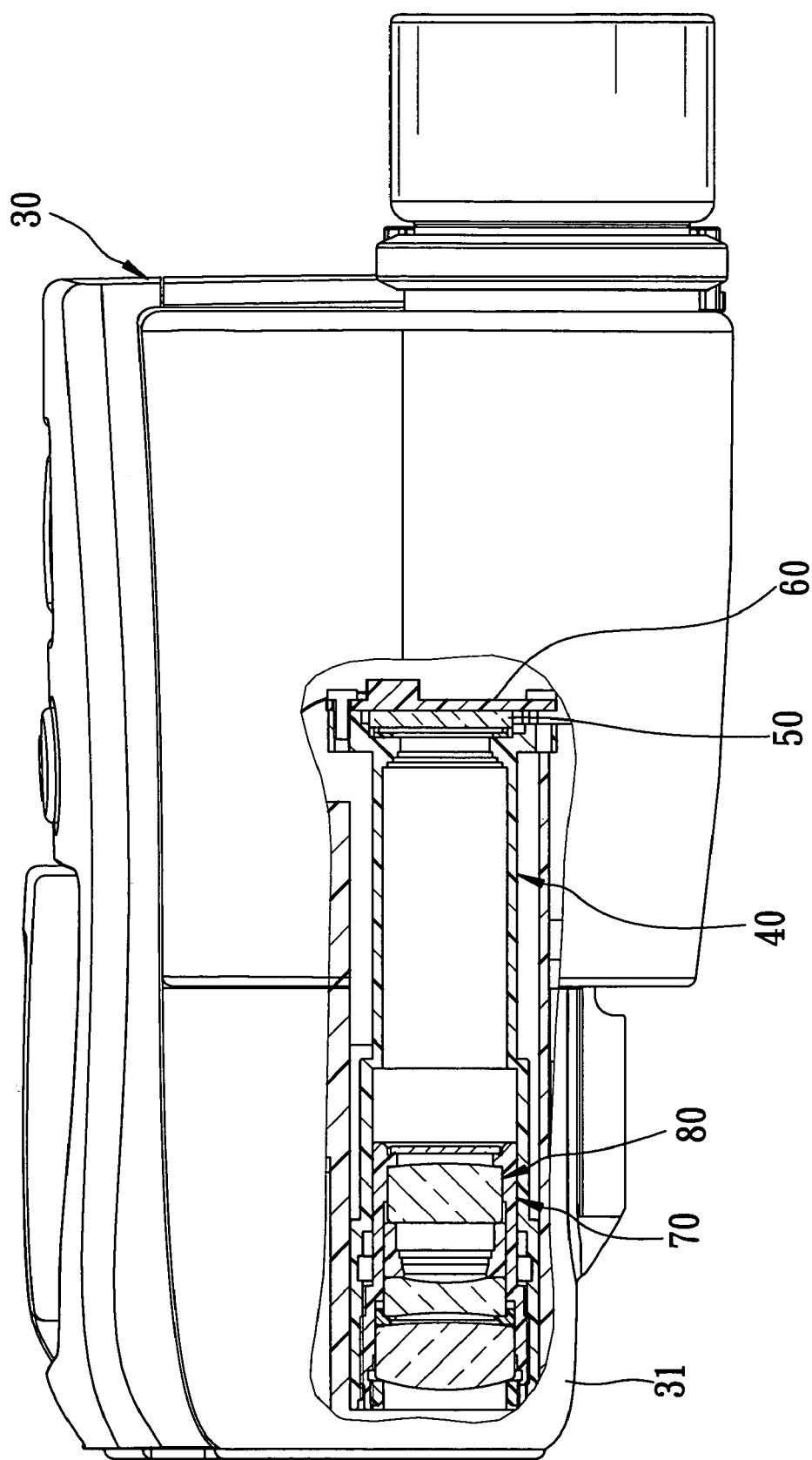
FIG. 3 is a sectional view of a digital optical instrument provided with the first preferred embodiment of the digital image-capturing device according to the present invention.

As shown in FIG. 3, the digital image-capturing device according to the present invention is adapted for mounting in a casing 31 of a digital optical instrument 30, such as a telescope.

Figure 4:
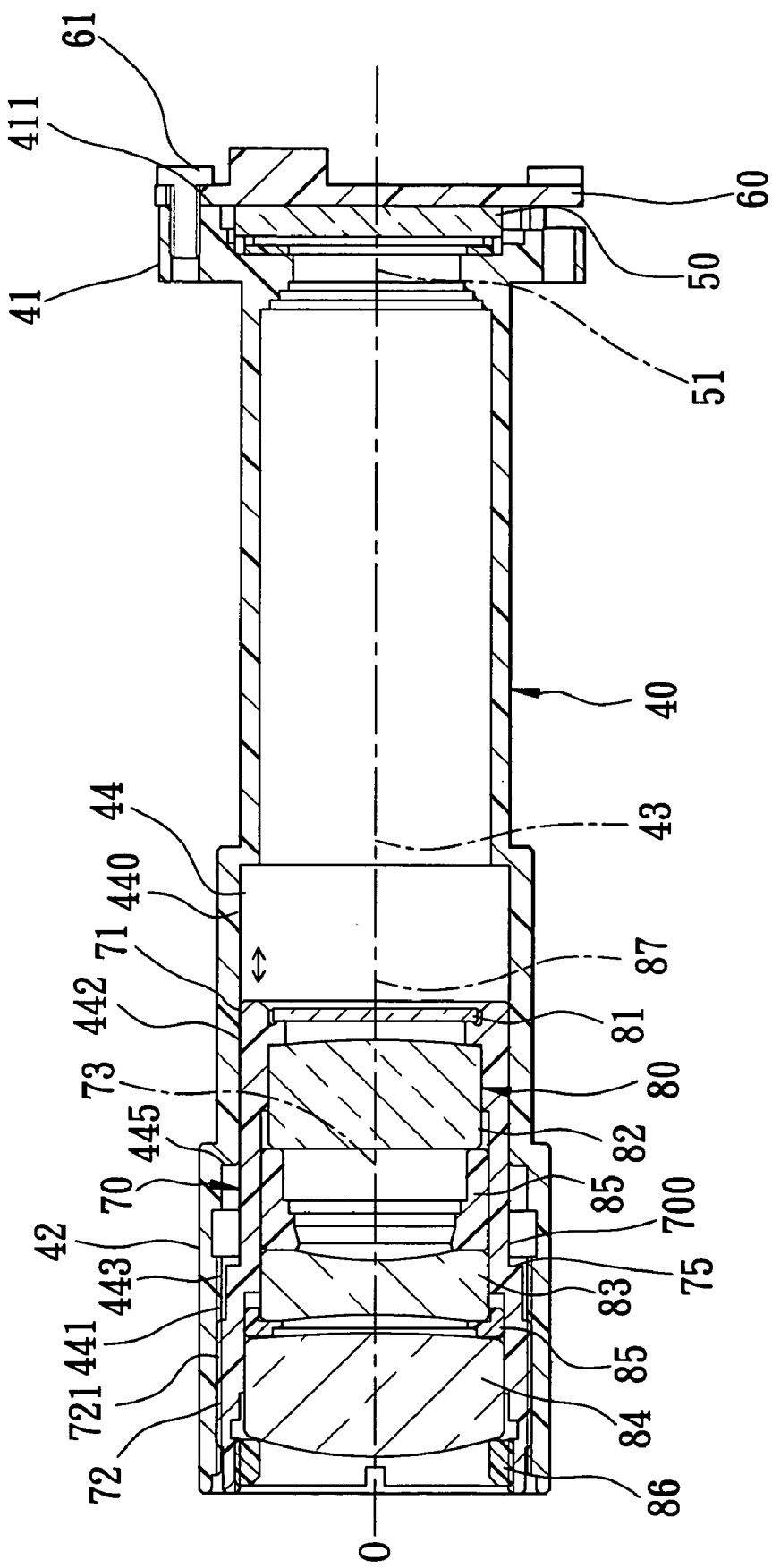
FIG. 4 is an assembled sectional view of the first preferred embodiment of the digital image-capturing device according to the present invention.

As shown in FIG.4, the first preferred embodiment of a digital image-capturing device according to the present invention comprises an outer lens barrel 40, an image sensor 50 disposed in the outer lens barrel 40, a circuit board 60 having the image sensor 50 mounted thereon, an inner lens barrel 70, and a lens module 80 mounted in the inner lens barrel 70. The digital image-capturing device has an optical axis (O).

The outer barrel 40 has a first barrel portion 41, a second barrel portion 42, a first central axis 43, and a barrel hole 44 extending through the first barrel portion 41 and the second barrel portion 42 along the first central axis 43. The first barrel portion 41 has a distal end part 411 remote from the second barrel portion 42. The second barrel portion 42 has a hole-confining surface 440, which is formed with a barrel coupling segment 441 and a barrel guiding segment 442. The barrel coupling segment 441 is formed with an internal screw thread 443. In this embodiment, the inner diameter of the barrel coupling segment 441 is larger than the inner diameter of the barrel guiding segment 442, such that the hole-confining surface 440 is configured with a first shoulder 445 at a junction of the barrel coupling segment 441 and the barrel guiding segment 442.

The image sensor 50 is disposed in the first barrel portion 41 of the outer lens barrel 40.

The circuit board 60 is fastened to the distal end part 411 of the first barrel portion 41 with the use of fasteners 61, and is electrically connected to the image sensor 50.

A Charged Coupled Device (CCD) is used as the image sensor 50 in the first preferred embodiment for further illustration. The CCD is used to detect images and to transfer digital information about the images to the circuit board 60 in order to permit subsequent Digital Signal Processing (DSP) on the captured images. The image sensor 50 has an optical axis 51 aligned with the optical axis (O).

The inner lens barrel 70 is mounted in the second barrel portion 42 of the outer lens barrel 40, and has a second central axis 73, and an outer barrel surface 700 formed with a barrel engaging segment 72 and a barrel sliding segment 71. The outer diameter of the barrel engaging segment 72, which corresponds to the inner diameter of the barrel coupling segment 441, is larger than the outer diameter of the barrel sliding segment 71, which corresponds to the barrel guiding segment 442. As a result, the outer barrel surface 700 of the inner lens barrel 70 is configured with a second shoulder 75 at a junction of the barrel engaging segment 72 and the barrel sliding segment 71. The barrel engaging segment 72 is formed with an external screw thread 721 to engage threadedly the internal screw thread 443 of the barrel coupling segment 441, while the barrel sliding segment 71 is indirect sliding and rotatable contact with the barrel guiding segment 442.

In view of the threaded engagement between the barrel coupling segment 441 and the barrel engaging segment 72, rotation of the inner lens barrel 70 relative to the outer lens barrel 40 results in movement of the inner lens barrel 70 relative to the image sensor 50 along the optical axis (O). In addition, because of the direct sliding and rotatable contact between the barrel guiding segment 442 and the barrel sliding segment 71, the inner lens barrel 70 can be prevented from wobbling in the outer lens barrel 40 during linear movement along the optical axis (O), thus ensuring alignment of the second central axis 73 with the first central axis 43 when the inner lens barrel 70 is mounted in the outer lens barrel 40.

The lens module 80 has a light-filtering lens 81 secured in the inner lens barrel 70, a set of three focusing lenses 82, 83, 84, spacers 85 respectively disposed between adjacent ones of the focusing lenses 82, 83, 84, and a press ring 86 mounted on the side of focusing lens 84 that is remote from the distal end part 411 of the first barrel portion 41. The lens module 80 has an optical axis 87 aligned with the second central axis 73 and thus with the optical axis (O). The lens module 80 has the function of projecting images onto the image sensor 50.

Only the inner lens barrel 70 is required to be turned to perform focusing adjustments. Since the outer lens barrel 40 is fixed, the inner lens barrel 70 moves along the optical axis (O), thus, causing the lens module 80 to move closer to or away from the image sensor 50.

Because the barrel guiding segment 442 in the present invention can guide and confine the barrel sliding segment 71, when the inner lens barrel 70 moves along the optical axis (O), even if there are gaps present between the internal screw thread 443 and the external screw thread 721, wobbling of the inner lens barrel 70 in the outer lens barrel 40 can be prevented. Accordingly, the deviation of the optical axis 87 of the lens module 80 from the optical axis 87 of is prevented, and hence, the quality of images captured by the digital image-capturing device of this invention is ensured.

Figure 5:
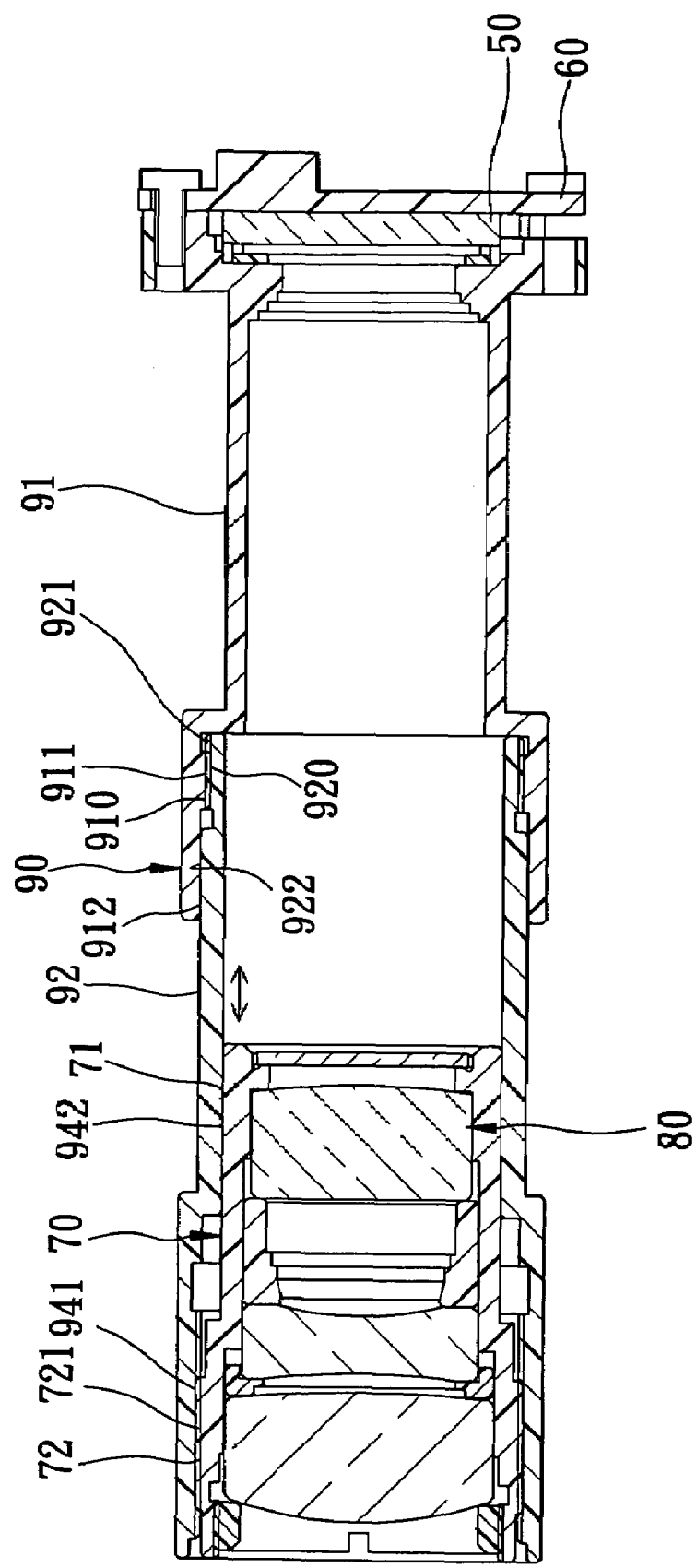
FIG. 5 is an assembled sectional view of the second preferred embodiment of the digital image-capturing device according to the present invention.

As shown in FIG. 5, the second preferred embodiment of a digital image-capturing device according to the present invention differs from the first preferred embodiment in that the first barrel portion 41 and the second barrel portion 42 of the outer lens barrel 40 in the first preferred embodiment are interconnected integrally, whereas the outer-lens barrel 90 of the second preferred embodiment includes a first barrel portion 91 and a second barrel portion 92 that are interconnected threadedly.

In the second preferred embodiment, an internal thread segment 911 is formed on an inner barrel surface 910 of the first barrel portion 91, and an external thread segment 921 is formed on an outer barrel surface 920 of the second barrel portion 92 to engage threadedly the internal thread segment 911. It should be noted that the arrangement of the internal thread segment 911 and the external thread segment 921 can be interchanged in other embodiments of this invention. In addition, the inner barrel surface 910 of the first barrel portion 91 has a non-threaded inner guiding segment 912, and the internal thread segment 911 is disposed between the inner guiding segment 912 and the image sensor 50. Furthermore, the outer barrel surface 920 of the second barrel portion 92 has a non-threaded outer sliding segment 922 that is in direct sliding and rotatable contact with the inner guiding segment 912.

Like the previous embodiment, the second barrel portion 92 has a hole-confining surface that is formed with a barrel coupling segment 941 and a barrel guiding segment 942, which are associated with the barrel engaging segment 72 and the barrel sliding segment 71 of the outer barrel surface of the inner lens barrel 70 in the manner described beforehand, thus achieving the same effects of the previous embodiment.

It should be noted that, in the second preferred embodiment, the inner diameter of the barrel coupling segment 941 is chosen to be larger than the inner diameter of the barrel guiding segment 942, and the outer diameter of the barrel engaging segment 72 is chosen to be larger than the outer diameter of the barrel sliding segment 71 solely for the sake of illustration. The digital image-capturing device according to the present invention can also be made with the inner diameter of the barrel coupling segment 941 smaller than the inner diameter of the barrel guiding segment 942, and with the outer diameter of the barrel engaging segment 72 smaller than the outer diameter of the barrel sliding segment 71.

It has been shown that due to the configuration of the barrel guiding segment 442 in the present invention, wobbling of the inner lens barrel 70 in the outer lens barrel 40 can be prevented when the inner lens barrel 70 moves along the optical axis (O), even if there are gaps present between the internal screw thread 443 and the external screw thread 721. Accordingly, the deviation of the optical axis 87 of the lens module 80 from the optical axis 87 of is prevented, and hence, the quality of images captured by the digital image-capturing device of this invention is ensured.

While the present invention has been described in connection with what is considered the most practical and preferred embodiments, it is understood that this invention is not limited to the disclosed embodiment but is intended to cover various arrangements included within the spirit and scope of the broadest interpretation as to encompass all such modifications and equivalent arrangements.

What is claimed is:

1. A digital image-capturing device comprising:
   an outer lens barrel having first and second barrel portions, and a barrel hole that extends through said first and second barrel portions, said second barrel portion having a hole-confining surface that is formed with a barrel coupling segment and a barrel guiding segment, said barrel coupling segment being formed with an internal screw thread, and said first and second barrel portions being interconnected integrally;
   an image sensor disposed in said first barrel portion of said outer lens barrel;
   an inner lens barrel mounted in said second barrel portion of said outer lens barrel, said inner lens barrel having an outer barrel surface that is formed with a barrel engaging segment and a barrel sliding segment, said barrel engaging segment being formed with an external screw thread to engage threadedly said internal screw thread of said barrel coupling segment of said hole-confining surface of said second barrel portion, said barrel sliding segment being in sliding and rotatable contact with said barrel guiding segment of said hole-confining surface of said second barrel portion; and
   a lens module mounted in said inner lens barrel;
   wherein said barrel coupling segment has a first inner diameter and said barrel guiding segment has a second inner diameter, the first and second inner diameters are sized differently such that said hole-confining surface of said second barrel portion of said outer lens barrel is configured with a first shoulder; and
   wherein said barrel engaging segment has a first outer diameter corresponding to the first inner diameter, and said barrel sliding segment has a second outer diameter corresponding to the second inner diameter, the first and second outer diameters are sized differently such that said outer barrel surface of said inner lens barrel is configured with a second shoulder.

2. The digital image-capturing device as claimed in claim 1, wherein the first inner diameter is larger than the second inner diameter, and the first outer diameter is larger than the second outer diameter.

3. The digital image-capturing device as claimed in claim 2, wherein said barrel coupling segment and said barrel guiding segment of said hole-confining surface of said second barrel portion are respectively disposed remote from and proximate to said first barrel portion.

4. A digital image-capturing device comprising:
   an outer lens barrel having first and second barrel portions, and a barrel hole that extends through said first and second barrel portions, said second barrel portion having a hole-confining surface that is formed with a barrel coupling segment and a barrel guiding segment, said barrel coupling segment being formed with an internal screw thread, and said first and second barrel portions being interconnected threadedly;
   an image sensor disposed in said first barrel portion of said outer lens barrel;
   an inner lens barrel mounted in said second barrel portion of said outer lens barrel, said inner lens barrel having an outer barrel surface that is formed with a barrel engaging segment and a barrel sliding segment, said barrel engaging segment being formed with an external screw thread to engage threadedly said internal screw thread of said barrel coupling segment of said hole-confining surface of said second barrel portion, said barrel sliding segment being in sliding and rotatable contact with said barrel guiding segment of said hole-confining surface of said second barrel portion; and
   a lens module mounted in said inner lens barrel;
   wherein said first barrel portion has an inner barrel surface formed with an internal thread segment, and said second barrel portion has an outer barrel surface formed with an external thread segment to engage said internal thread segment of said inner barrel surface of said first barrel portion;
   wherein said inner barrel surface of said first barrel portion further has a non-threaded inner guiding segment, said internal thread segment being disposed between said inner guiding segment and said image sensor; and
   wherein said outer barrel surface of said second barrel portion further has a non-threaded outer sliding segment that is in sliding and rotatable contact with said inner guiding segment of said inner barrel surface of said first barrel portion.

5. A digital image-capturing device comprising:
   an outer lens barrel having first and second barrel portions, and a barrel hole that extends through said first and second barrel portions, said second barrel portion having a hole-confining surface that is formed with a barrel coupling segment and a barrel guiding segment, said barrel coupling segment being formed with an internal screw thread, and said first and second barrel portions being interconnected threadedly;

an image sensor disposed in said first barrel portion of said outer lens barrel;

an inner lens barrel mounted in said second barrel portion of said outer lens barrel, said inner lens barrel having an outer barrel surface that is formed with a barrel engaging segment and a barrel sliding segment, said barrel engaging segment being formed with an external screw thread to engage threadedly said internal screw thread of said barrel coupling segment of said hole-confining surface of said second barrel portion, said barrel sliding segment being in sliding and rotatable contact with said barrel guiding segment of said hole-confining surface of said second barrel portion; and a lens module mounted in said inner lens barrel;

wherein said first barrel portion has an inner barrel surface formed with an internal thread segment, and said second barrel portion has an outer barrel surface formed with an external thread segment to engage said internal thread segment of said inner barrel surface of said first barrel portion;

wherein said barrel coupling segment has a first inner diameter and said barrel guiding segment has a second inner diameter, the first and second inner diameters are sized differently such that said hole-confining surface of said second barrel portion of said outer lens barrel is configured with a first shoulder; and wherein said barrel engaging segment has a first outer diameter corresponding to the first inner diameter, and said barrel sliding segment has a second outer diameter corresponding to the second inner diameter, the first and second outer diameters are sized differently such that said outer barrel surface of said inner lens barrel is configured with a second shoulder.

6. The digital image-capturing device as claimed in claim 5, wherein the first inner diameter is larger than the second inner diameter, and the first outer diameter is larger than the second outer diameter.

7. The digital image-capturing device as claimed in claim 6, wherein said barrel coupling segment and said barrel guiding segment of said hole-confining surface of said second barrel portion are respectively disposed remote from and proximate to said first barrel portion.

* * * * *